US009633757B2

(12) United States Patent
Wakabayashi et al.

(10) Patent No.: US 9,633,757 B2
(45) Date of Patent: Apr. 25, 2017

(54) WIRE HARNESS AND WIRE HARNESS MANUFACTURING METHOD

(71) Applicant: Sumitomo Wiring Systems, Ltd, Yokkaichi, Mie (JP)

(72) Inventors: Masataka Wakabayashi, Mie (JP); Hiroyuki Ootsuki, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 14/957,718

(22) Filed: Dec. 3, 2015

(65) Prior Publication Data

US 2016/0163416 A1 Jun. 9, 2016

(30) Foreign Application Priority Data

Dec. 4, 2014 (JP) ................................ 2014-246098

(51) Int. Cl.

| | |
|---|---|
| ***H01B 7/00*** | (2006.01) |
| ***B29C 65/00*** | (2006.01) |
| ***H01B 3/30*** | (2006.01) |
| ***B29C 65/56*** | (2006.01) |
| ***H01B 13/02*** | (2006.01) |
| ***H01B 7/02*** | (2006.01) |

(52) U.S. Cl.

CPC .......... *H01B 7/0045* (2013.01); *H01B 3/302* (2013.01)

(58) Field of Classification Search

CPC .. H01B 7/0045; H01B 13/01209; H01B 7/02; H01B 3/302; B29C 65/56; B29C 66/034; B29C 66/4322; B29C 66/71; B29C 66/7315

USPC .......................................... 174/72 A; 156/53

See application file for complete search history.

(56) References Cited

U.S. PATENT DOCUMENTS

| | | | | |
|---|---|---|---|---|
| 6,069,319 A * | 5/2000 | Davis, Jr. | B29C 44/12 | 174/110 F |
| 6,120,327 A * | 9/2000 | O'Brien | B29C 44/12 | 174/72 A |
| 2004/0248434 A1* | 12/2004 | Fujimura | H01R 4/01 | 439/67 |

FOREIGN PATENT DOCUMENTS

| | | |
|---|---|---|
| JP | 03261317 * | 11/1991 |
| JP | H08-274488 A | 10/1996 |
| JP | 2013-258304 A | 12/2013 |

* cited by examiner

*Primary Examiner* — Timothy Thompson
*Assistant Examiner* — Charles Pizzuto
(74) *Attorney, Agent, or Firm* — Dinsmore & Shohl LLP

(57) ABSTRACT

A wire harness having a portion of an electrical line group configured to easily housed in a protector without requiring the task of opening an overlapping portion of the protector, and a method for manufacturing said wire harness are provided. The protector includes a shape-memory panel having a shape-memory polymer sheet and noise suppression metal coating films formed on two surfaces thereof and are electrically conductive with each other. The shape-memory polymer sheet is molded in a shape-memory state for covering a portion of the electrical line group in a scroll-like manner, and then opened into a flat plate shape. The portion of the electrical line group is placed on the flat plate-shaped shape-memory panel, and then heated so that the shape-memory panel returns to the shape-memory state and covers the portion of the electrical line group in a scroll-like manner.

12 Claims, 7 Drawing Sheets

WIRE HARNESS AND WIRE HARNESS MANUFACTURING METHOD

CROSS-REFERENCE TO RELATED APPLICATIONS

This application claims priority to Japanese Patent Application 2014-246098 filed Dec. 4, 2014.

FIELD OF THE INVENTION

The present invention relates to a wire harness and a wire harness manufacturing method.

BACKGROUND OF THE INVENTION

Conventionally, a wire harness 101, as shown in FIGS. 6A to 6C and FIG. 7, includes an electrical line group 50, which is made up of multiple electrical lines 51, and a protector (insulating cover) 60, which is formed in the shape of a scroll that has an overlapping wrapping portion 62, which covers a portion 52, requiring protection, of the electrical line group 50 in a scroll-like manner (see JP H08-274488A).

The wire harness 101 is formed by rolling a synthetic resin sheet 61 into a scroll shape at a high temperature necessary to form the protector 60, then manually opening the overlapping wrapping portion 62 at a bending start portion 63 of the sheet 61 to form an opening portion 64, and then inserting the portion 52 of the electrical line group 50 requiring protection into the protector 60 through the opening portion 64 so as to be enveloped in a conductive sheet 65 for noise suppression.

JP H08-274488A is an example of related art.

However, the wire harness 101 disclosed in JP H08-274488A has a problem in that when the portion 52 requiring protection of the electrical line group 50 is to be housed in the scroll-like protector 60 in the state of being enveloped in the conductive sheet 65, it is necessary to perform the task of manually opening the overlapping wrapping portion 62 at the bending start portion 63 of the sheet 61, and therefore the step for housing the portion requiring protection 52 of the electrical line group 50 into the protector 60 is a factor that raises production cost.

Attaching the protector 60 and the electrical line group 50 housed in the protector 60 to each other requires the task of wrapping adhesive tape around the two end portions of the protector 60 and the portions of the electrical line group 50 that are exposed from the end portions of the protector 60, and this step is also a factor that raises production cost.

SUMMARY OF THE INVENTION

The present invention was made in order to resolve the above-described issues, and the objective thereof is to provide a wire harness that has high productivity and makes it possible for a portion requiring protection of an electrical line group to be easily housed in a protector without requiring the task of opening an overlapping portion of the protector, as well as a method for manufacturing this wire harness.

In order to achieve the aforementioned result, a wire harness according to an aspect of the present invention is a wire harness including: an electrical line group made up of a plurality of electrical lines; and a protector that has an overlapping wrapping portion and covers a portion of the electrical line group in a scroll-like manner, wherein the protector is formed by a shape-memory panel that includes a shape-memory polymer sheet and noise suppression metal coating films that are formed on two surfaces of the shape-memory polymer sheet and are electrically conductive with each other, the shape-memory polymer sheet being molded in a shape-memory state for covering a portion of the electrical line group in a scroll-like manner, and then opened into a flat plate shape, and the portion of the electrical line group requiring protection being placed on the flat plate-shaped shape-memory panel, heat is applied so that the shape-memory panel returns to the shape-memory state and covers the portion of the electrical line group in a scroll-like manner.

In the present configuration of the wire harness, by placing the portion of the electrical line group on the shape-memory panel that has been opened into a flat plate shape and then heated, the protector returns to the shape-memory state so as to cover the portion of the electrical line group in a scroll-like manner.

Accordingly, the wire harness of the present invention, the portion of the electrical line group requiring protection may be easily housed in the protector without manually opening an overlapping wrapping portion as in conventional technology. In the event that the amount of the overlapping wrapping portion in the protector is increased, the portion of the electrical line group can be automatically housed in a protector that has an electromagnetic shielding property. the assembly process is improved over a process for enveloping the electrical line group in a conductive sheet as in conventional technology, and it is possible to reduce production cost.

In the above-described wire harness, it is preferable that the protector is formed by the shape-memory panel that is molded in a shape-memory state for covering the portion of the electrical line group in a scroll-like manner with an inner diameter that constricts the electrical line group, and is then opened into a flat plate shape, the shape-memory panel returning to the shape-memory state by being heated, so as to cover and constrict the protection-required portion of the electrical line group in a scroll-like manner.

In this configuration, when the wire harness returns to the shape-memory state, the protector covers the portion of the electrical line group in a scroll-like manner and constricts the electrical line group, thus eliminating for applying a wrapping tape in order to constrict the protector and fix the electrical line group.

In the above-described wire harness, it is preferable that the protector is formed by the shape-memory panel that has the overlapping wrapping portion with a circumferential length at least greater than or equal to one-half the circumference of the electrical line group, is molded in a shape-memory state for covering the protection-required portion of the electrical line group in a scroll-like manner, and is then opened into a flat plate shape, the shape-memory panel returning to the shape-memory state by applying heat, so as to cover the portion of the electrical line group in a scroll-like manner.

In this configuration of the present invention, i the protector has the overlapping wrapping portion with a circumferential length at least greater than or equal to one-half the circumference of the electrical line group, and covers the portion of the electrical line group in a scroll-like manner, and therefore even if the protector is bent with a small radius during layout of the wire harness, the overlapping wrapping portion does not become turned up, and the portion of the electrical line group does not protrude away from the protector.

In the above-described wire harness, it is preferable that the shape-memory polymer forming the sheet is a shape-memory polymer that includes polyol and isocyanate and has a glass transition point Tg set to 80° C. or higher.

According to this configuration of the present invention, the protector can be kept in the shape-memory state even in warmer temperatures.

The wire harness manufacturing method according to the present invention includes the steps of; preparing the above-described shape-memory panel opened into a flat plate shape; placing the portion of the electrical line group on the shape-memory panel; and providing the protector that covers the portion of the electrical line group in a scroll-like manner, by causing the shape-memory panel to return to the shape-memory state by heating the shape-memory panel to a necessary temperature.

According to this configuration of the wire harness manufacturing method by merely placing the portion of the electrical line group on the shape-memory panel that has been opened into a flat plate shape and then applying heat, the protector returns to the shape-memory state so as to cover the portion of the electrical line group in a scroll-like manner.

For this reason, the wire harness manufacturing method according to the present invention makes it possible for the portion of the electrical line group to be easily housed in the protector, the ease of assembly improves, and it is possible to reduce production cost.

According to the present invention, it is possible to provide a wire harness that has high productivity and makes it possible for the portion of the electrical line group to be easily housed in the protector without requiring the task of opening the overlapping portion of the protector, as well as a method for manufacturing this wire harness.

DETAILED DESCRIPTION OF THE PREFERRED EMBODIMENT

Figure 1:
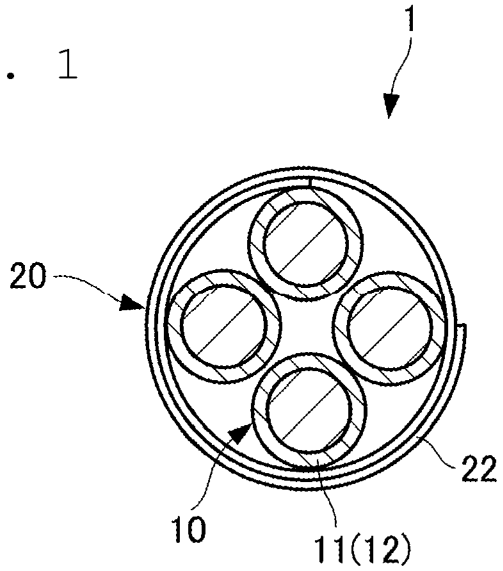
FIG. 1 is a view along the axial direction of a wire harness according to an embodiment of the present invention.
Figure 2:
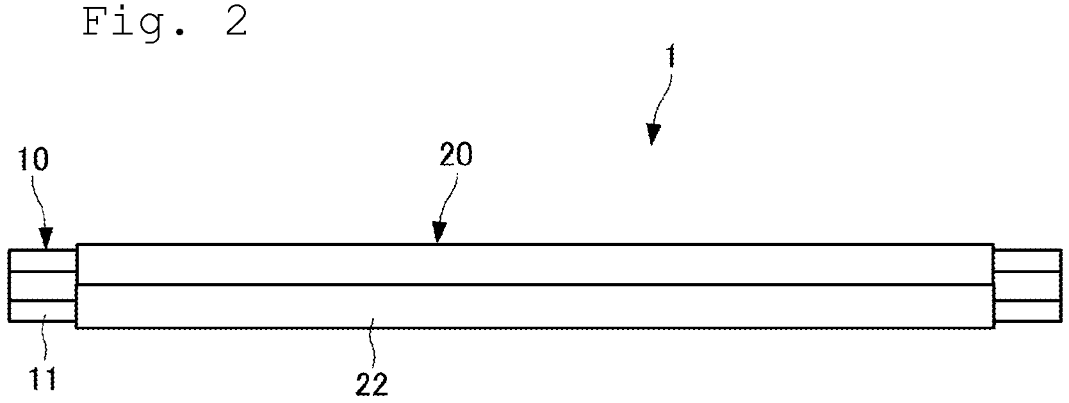
FIG. 2 is a side view of the wire harness according to the embodiment of the present invention.
Figure 3:
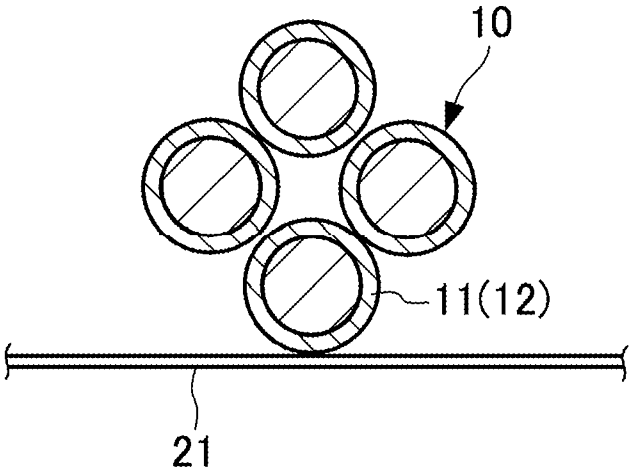
FIG. 3 is a process diagram showing a wire harness manufacturing method according to an embodiment of the present invention.

A wire harness and a wire harness manufacturing method according to embodiments of the present invention will be described below with reference to the drawings.

As shown in FIG. 1 to FIG. 4B, a wire harness 1 according to a first embodiment of the present invention includes an electrical line group 10, which is made up of multiple electrical lines 11, and a protector 20, which has an overlapping wrapping portion 22 and covers a portion 12 of the electrical line group 10 in a scroll-like manner. The portion 12 requires protection. The electrical line group 10 is obtained by bundling multiple electrical lines 11 together using adhesive tape or the like (not shown).

The protector 20 is constituted by a shape-memory panel 21 that includes a shape-memory polymer sheet 21*a* and noise suppression metal coating films 21*b* that are formed on the two surfaces of the shape-memory polymer sheet 21*a* and are electrically conductive with each other. The shape-memory polymer sheet 21*a* is molded in a shape-memory state having an inner diameter for covering and constricting the portion 12 of the electrical line group 10 in a scroll-like manner, and is then opened into a flat plate shape. The portion 12 of the electrical line group 10 is placed on the flat plate-shaped shape-memory panel 21, heat is applied so that the shape-memory panel 21 returns to the shape-memory state and covers the portion 12 of the electrical line group 10 in a scroll-like manner.

Figure 4A:
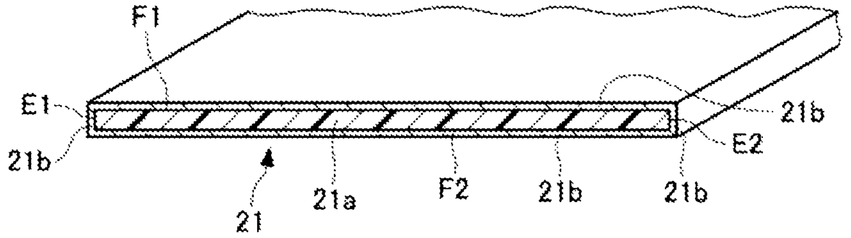
FIG. 4A is a cross-sectional view of a shape-memory panel according to a first embodiment of the present invention.
Figure 4B:
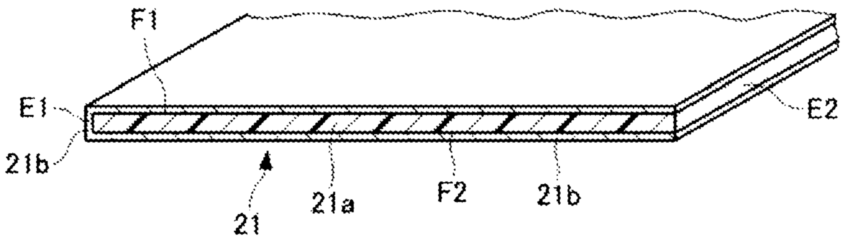
FIG. 4B is a cross-sectional view of a shape memory panel according to a second embodiment of the present invention.

It is preferable that the protector 20 has a configuration in which, as shown in FIG. 4A, the noise suppression metal coating films 21*b* are formed in an integrated manner on a first face F1, a second face F2, a first edge E1, and a second edge E2 of the shape-memory polymer sheet 21*a*, or has a configuration in which, as shown in FIG. 4B, the noise suppression metal coating films 21*b* are formed on the first face F1, the second face F2, and the first edge E1 of the shape-memory polymer sheet 21*a*, for example.

In the protector 20 shown in FIG. 4A, a noise suppression metal coating film 21*b* formed on the first face F1 of the shape-memory polymer sheet 21*a* and a noise suppression metal coating film 21*b* formed on the second face F2 of the shape-memory polymer sheet 21*a* are electrically connected by noise suppression metal coating films 21*b* formed on the first edge E1 and the second edge E2 of the shape-memory polymer sheet 21*a*.

In the protector 20 shown in FIG. 4B, a noise suppression metal coating film 21*b* formed on the first face F1 of the shape-memory polymer sheet 21*a* and a noise suppression metal coating film 21*b* formed on the second face F2 of the shape-memory polymer sheet 21*a* are electrically connected by a noise suppression metal coating film 21*b* formed on the first edge E1 of the shape-memory polymer sheet 21*a*.

The protector 20 has an axial length set so as to match the length of the portion 12 of the electrical line group 10, and the circumferential length of the overlapping wrapping portion 22 is set to, for example, approximately three-fourths the circumference of the electrical line group 10. It is preferable that the circumferential length of the overlapping wrapping portion 22 is greater than or equal to one-half the circumference of the electrical line group 10.

Accordingly, it is preferable that the thickness of the shape-memory panel 21 is approximately 0.5 to 3.0 mm, for example. Also, the width of the shape-memory panel 21 is a length obtained by adding a wrapping margin corresponding to the overlapping wrapping portion 22 to the circumference when wrapped so as to constrict the electrical line group 10, and the length of the shape-memory panel 21 is set according to the length of the portion 12 of the electrical line group 10.

Figure 5:
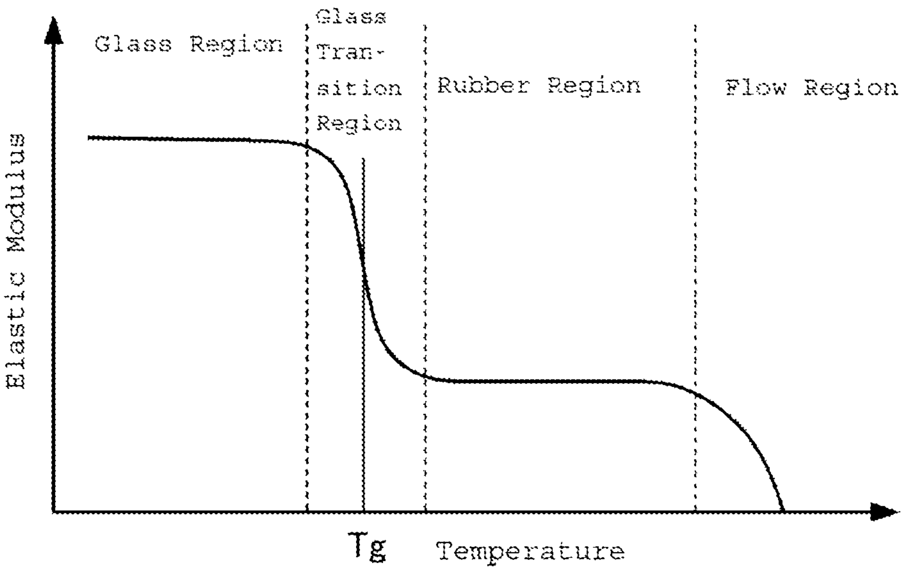
FIG. 5 is a graph showing the temperature dependency of the elastic modulus of a shape-memory polymer.
Figure 6A:
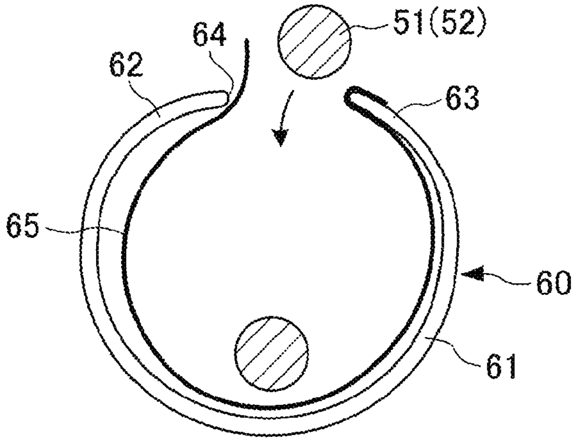
Fig. 6A PRIOR ART
FIG. 6A shows a configuration where an electrical line group is being housed in a protector.
Figure 6B:
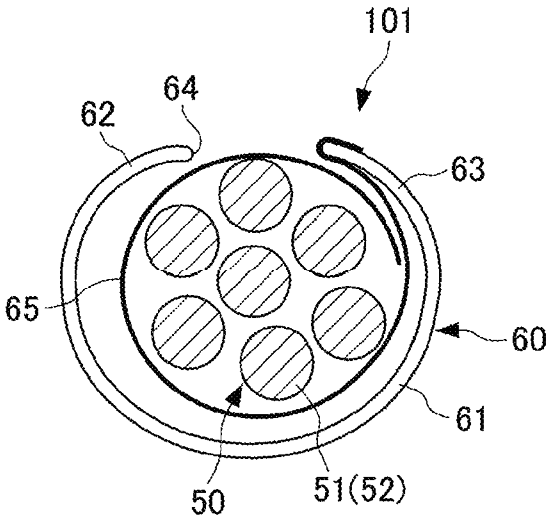
Fig. 6B PRIOR ART
FIG. 6B shows the electrical line group enveloped in a conductive sheet.
Figure 6C:
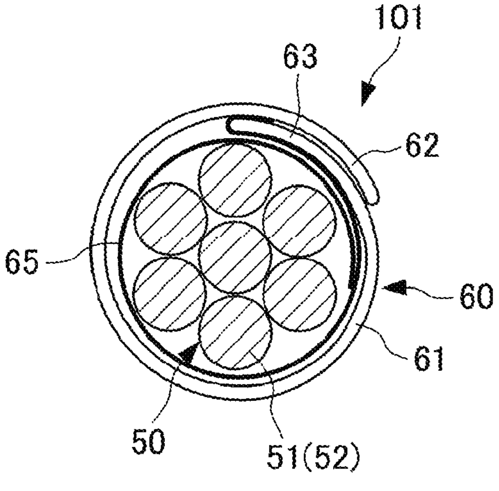
Fig. 6C PRIOR ART
FIG. 6C shows the state after housing of the electrical line group in the protector.
Figure 7:
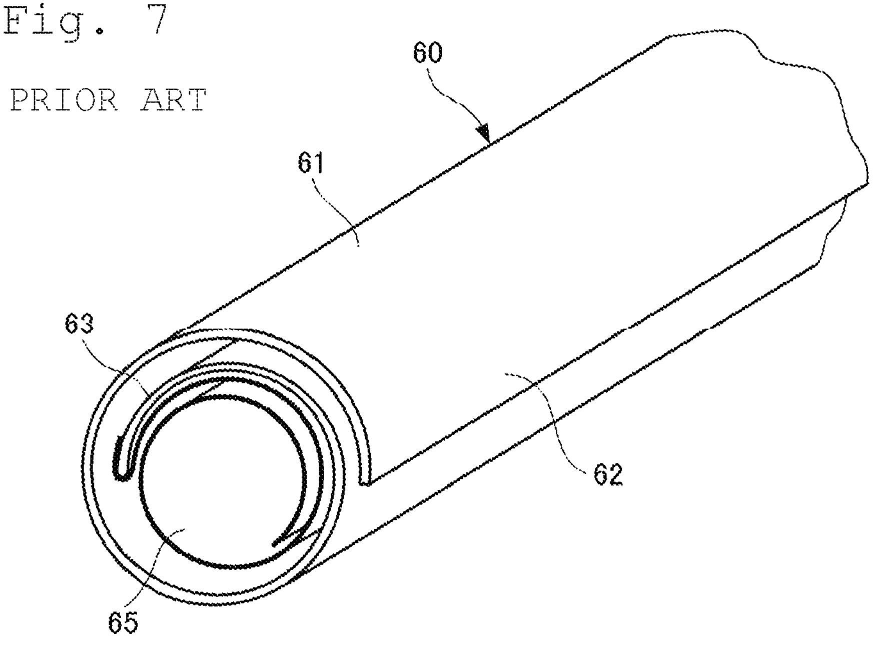
Fig. 7 PRIOR ART
FIG. 7 is a partial perspective view of the protector of the conventional wire harness.

The shape-memory polymer that forms the shape-memory polymer sheet 21*a* is a substance that becomes deformed when subjected to force after being molded, but returns to its shape from before deformation when heated to a certain temperature or higher. As shown in FIG. 5, its elastic modulus is dependent on the temperature and reversibly changes at the glass transition point (called "Tg" hereinafter).

This shape-memory polymer has a property of becoming soft like rubber and easily moldable at a temperature greater than or equal to Tg, and becoming hard and holding its deformed shape if it is cooled to a temperature lower than Tg after being deformed by the application of force at a temperature in the vicinity of Tg (this property is called shape fixity), and also has a property of autonomously returning to the shape in which it was first molded upon being heated to a temperature greater than or equal to Tg after being deformed and hardening (this property is called shape recovery).

This shape-memory polymer is, for example, a polyurethane-based material produced using polyol and isocyanate or the like as raw materials, and the Tg thereof can be set in the range of 40 to 120° C. by adjusting the types (molecular structures), molecular weights, and proportions of the raw material components. The shape-memory polymer used for the protector 20 of the present embodiment has a Tg set to 80° C., which is higher than the temperature reached by the protector 20 during the summer.

The metal forming the noise suppression metal coating films 21*b* is formed on the surface of the shape-memory polymer sheet 21*a* using a known technique such as sputtering or radio-frequency ion plating.

The noise suppression metal coating films 21*b* are formed using aluminum or the like in the case where the protector 20 is used as a shield for electrostatic shielding, and are formed using iron or the like in the case where the protector 20 is used as a shield for electromagnetic shielding.

To obtain the protector 20, first a shape-memory polymer is heated to a temperature greater than or equal to Tg by applying heat, so as to become soft, the shape-memory polymer is then molded into a shape-memory state for covering a jig (not shown) in a scroll-like manner, then cooled, then opened into a flat plate shape by the application of force in the vicinity of Tg, and then cooled to a temperature below Tg by the blowing of cold air, for example, thus forming the shape-memory panel 21. The jig has a cross-sectional shape with an outer diameter slightly smaller than that of the electrical line group 10.

Then the portion 12 of the electrical line group 10 is placed on the flat plate-shaped shape-memory panel 21, and the shape-memory panel 21 is heated to a temperature greater than or equal to Tg, and thus the protector 20 returns to the shape-memory state so as to cover and constrict the protection-required portion 12 of the electrical line group 10 in a scroll-like manner.

With the wire harness 1 of the present embodiment, by merely placing the portion 12 of the electrical line group 10 on the shape-memory panel 21 that has been opened into a flat plate shape and then heated, the protector 20 returns to the shape-memory state so as to cover and constrict the portion 12 of the electrical line group 10 in a scroll-like manner.

For this reason, with the wire harness 1 of the present embodiment, it is possible for the portion 12 of the electrical line group 10 to be easily housed in the protector 20. The amount of manual labor required for attaching the protector 20 can be significantly reduced, there is no need for applying wrapping tape in order to constrict the protector 20 and fix the electrical line group 10.

In the wire harness 1 of the present embodiment, the protector 20 has the overlapping wrapping portion 22 with a circumferential length that is at least three-fourths the circumference of the electrical line group 10, and covers the portion 12 of the electrical line group 10 in a scroll-like manner.

For this reason, with the wire harness 1 of the present embodiment, even if the protector 20 is bent with a small radius during layout of the wire harness 1, the overlapping wrapping portion 22 does not become turned up, and the portion 12 of the electrical line group 10 does not protrude outward from the protector 20.

If the wire harness 1 of the present embodiment has a configuration in which the protector 20 has the overlapping wrapping portion 22 with a circumferential length twice the circumference of the electrical line group 10 and covers the portion 12 of the electrical line group 10 in a scroll-like manner, the protector 20 can be bent by reducing the thickness of the shape-memory panel 21, and layout can be performed favorably.

Furthermore, in the wire harness 1 of the present embodiment, Tg of the shape-memory polymer forming the protector 20 is set to 80° C. or higher, and therefore the protector 20 can be kept in the shape-memory state in warmer climates.

As described above, the wire harness and the wire harness manufacturing method according to the present invention makes it is possible for the portion of the electrical line group to be easily housed in the protector without requiring the task of opening the overlapping portion of the protector, thus having an effect of having high productivity, and being useful to general wire harnesses and wire harness manufacturing methods.

What is claimed is:

1. A wire harness comprising:

an electrical line group, the electrical line group made up of a plurality of electrical lines; and a protector that has an overlapping wrapping portion and covers a portion of the electrical line group requiring protection in a scroll-like manner, wherein the protector is constituted by a shape-memory panel that includes a shape-memory polymer sheet and noise suppression metal coating films that are formed on two surfaces of the shape-memory polymer sheet and are electrically conductive with each other, the shape-memory polymer sheet being molded in a shape-memory state for covering the portion of the electrical line group in the scroll-like manner, and then opened into a flat plate shape so as to form a flat plate shape, and the portion of the electrical line group being placed on the flat plate shape of the shape-memory panel, wherein the protector may be heated so that the shape-memory panel returns to the shape-memory state and covers the portion of the electrical line group in the scroll-like manner.

2. The wire harness according to claim 1, wherein the protector is constituted by the shape-memory panel that is molded in the shape-memory state for covering the portion of the electrical line group in the scroll-like manner with an inner diameter that constricts the electrical line group, and is then opened into the flat plate shape, the shape-memory panel returning to the shape-memory state due to being heated, so as to cover and constrict the portion of the electrical line group in the scroll-like manner.

3. The wire harness according to claim 1, wherein the overlapping wrapping portion of the shape-memory panel has a circumferential length at least greater than or equal to one-half a circumference of the electrical line group, is molded in the shape-memory state for covering the portion of the electrical line group in the scroll-like manner, and is then opened into the flat plate shape, the shape-memory panel returning to the shape-memory state due to being heated, so as to cover the portion of the electrical line group in the scroll-like manner.

4. The wire harness according to claim 2, wherein the overlapping wrapping portion of the shape-memory panel has a circumferential length at least greater than or equal to one-half a circumference of the electrical line group, is molded in the shape-memory state for covering the portion of the electrical line group in the scroll-like manner, and is then opened into the flat plate shape, the shape-memory panel returning to the shape-memory state due to being heated, so as to cover the portion of the electrical line group in the scroll-like manner.

5. The wire harness according to claim 1, wherein the shape-memory polymer sheet is formed from a shape-memory polymer that includes polyol and isocyanate and has a glass transition point Tg set to 80° C. or higher.

6. The wire harness according to claim 2, wherein the shape-memory polymer sheet is formed from a shape-memory polymer that includes polyol and isocyanate and has a glass transition point Tg set to 80° C. or higher.

7. The wire harness according to claim 3, wherein the shape-memory polymer sheet is formed from a shape-memory polymer that includes polyol and isocyanate and has a glass transition point Tg set to 80° C. or higher.

8. The wire harness according to claim 4, wherein the shape-memory polymer sheet is formed from a shape-memory polymer that includes polyol and isocyanate and has a glass transition point Tg set to 80° C. or higher.

9. A method for manufacturing a wire harness, comprising the steps of:

providing the wire harness, the wire harness having an electrical line group, the electrical line group made up of a plurality of electrical lines, a protector that has an overlapping wrapping portion and covers a portion of the electrical line group requiring protection in a scroll-like manner, wherein the protector is constituted by a shape-memory panel that includes a shape-memory polymer sheet and noise suppression metal coating films that are formed on two surfaces of the shape-memory polymer sheet and are electrically conductive with each other, the shape-memory polymer sheet being molded in a shape-memory state for covering the portion of the electrical line group in the scroll-like manner, and then opened into a flat plate shape so as to form a flat plate shape, and the portion of the electrical line group being placed on the flat plate shape of the shape-memory panel, wherein the protector may be heated so that the shape-memory panel returns to the shape-memory state and covers the portion of the electrical line group in the scroll-like manner;

preparing the shape-memory panel opened into the flat plate shape;

placing the portion of the electrical line group on the shape-memory panel; and providing the protector that covers the portion of the electrical line group in the scroll-like manner, by causing the shape-memory panel to return to the shape-memory state by heating the shape-memory panel to a necessary temperature.

10. The method as set forth in claim 9, wherein the protector is constituted by the shape-memory panel that is molded in the shape-memory state for covering the portion of the electrical line group in the scroll-like manner with an inner diameter that constricts the electrical line group, and is then opened into the flat plate shape, the shape-memory panel returning to the shape-memory state due to being heated, so as to cover and constrict the portion of the electrical line group in the scroll-like manner.

11. The method as set forth in claim 10, wherein the overlapping wrapping portion of the shape-memory panel has a circumferential length at least greater than or equal to one-half a circumference of the electrical line group, is molded in the shape-memory state for covering the portion of the electrical line group in the scroll-like manner, and is then opened into the flat plate shape, the shape-memory panel returning to the shape-memory state due to being heated, so as to cover the portion of the electrical line group in the scroll-like manner.

12. The method as set forth in claim 11, wherein the shape-memory polymer sheet is formed from a shape-memory polymer that includes polyol and isocyanate and has a glass transition point Tg set to 80° C. or higher.

* * * * *